United States Patent

[11] 3,589,807

[72] Inventors Peter Andrews
 Penfield;
 Edward S. McKee, Rochester, both of, N.Y.
[21] Appl. No. 802,784
[22] Filed Feb. 27, 1969
[45] Patented June 29, 1971
[73] Assignee Eastman Kodak Company,
 Rochester, N.Y.

[54] FILM SNUBBER FOR A SPROCKETLESS MOTION-PICTURE PROJECTOR
 13 Claims, 4 Drawing Figs.
[52] U.S. Cl.................................................. 352/185,
 226/60, 242/75.3, 352/124
[51] Int. Cl.............................................. G03b 1/54
[50] Field of Search........................................ 352/185,
 166, 124, 173; 226/60; 242/209

[56] References Cited
 UNITED STATES PATENTS
3,240,550 3/1966 Mitchell et al................ 352/124
3,331,541 7/1967 Cherniavskyj et al. ....... 226/60
3,350,023 10/1967 Bundschuh.................... 226/60 X
3,460,889 8/1969 Wilharm........................ 352/124

FOREIGN PATENTS
1,280,670 10/1968 Germany...................... 352/166

Primary Examiner—Louis R. Prince
Assistant Examiner—Joseph W. Roskos
Attorneys—Robert W. Hampton and William C. Dixon, III ABSTRACT: A film snubber is provided for filtering out mechanical disturbances in the film-feeding system of a motion-picture projector and for actuating the projector rewind cycle. The snubber comprises a pair of angularly spaced arms extending radially outwardly from a hub that is pivotally mounted on the projector. A light torsion spring biases the snubber toward the portion of film extending between the film supply reel and the film projection gate so that the angularly spaced arms engage the film. The snubber is thus able to fluctuate freely, under the influence of the torsion spring, in response to variations in tension of the film engaged by the two arms, one of the arms so engaged may be formed as a resilient leaf spring to render it deflectable in response to variations in film tensions. Means for receiving a damping fluid between the snubber hub and its mount may also be included to provide a further means of responding to variations in film tension.

PETER ANDREWS
EDWARD S. MC KEE
INVENTORS

BY *William C. Dixon, III*

*Robert W Hampton*
ATTORNEYS

PETER ANDREWS
EDWARD S. MC KEE
INVENTORS

BY William C. Dixon, III
Robert W. Hampton
ATTORNEYS 3,589,807

FILM SNUBBER FOR A SPROCKETLESS MOTION-PICTURE PROJECTOR

BACKGROUND OF THE INVENTION

1. Field of the Invention

The present invention relates to motion-picture projectors, and particularly to a film snubber for filtering out mechanical disturbances in the film-feeding system of a motion-picture projector.

2. Description of the Prior Art

The conventional motion-picture projector intermittently feeds film, a frame at a time, past the projection aperture of a gate, and depends upon the presence of a free loop of film in advance of and beyond the gate in order to isolate the intermittent film feed and gate from the film supply and film takeup reels and thereby ensure a steadiness of the film in the gate when the intermittent mechanism is not advancing film. In the prior art, these free film loops at both sides of the gate have been maintained by constantly rotating feed sprockets, which advance the film from the film supply reel to the gate and from the gate to the film takeup reel at such a rate as to maintain the free loops. The sprockets thus serve to isolate film in the gate from any transient forces on the film originating at the reels which might cause an unsteadiness of film in the gate.

A sprocketless projector is one that does not have one or more constantly driven sprockets for feeding the film to and from free loops at both sides of the gate. Instead of sprockets, such projectors rely upon spring-loaded snubbers, or the like, located between the gate and each reel to maintain the equivalent of a free loop of film at each side of the gate and thereby isolate the intermittent film advancing mechanism and the gate from momentary overloads which might be imposed on film in the gate because of the inertia of the reels and their drive mechanisms.

Difficulty has been encountered in motion-picture projectors of the sprocketless type when reels of 400-foot capacity have been used, the difficulty being an unsteadiness in the projected image beyond that which is considered tolerable. The unsteadiness has been found to be primarily the result of the greater inertia of such reels as compared with the lesser inertia of smaller reels, the greater inertia of the larger reels producing transient loads on the portion of film engaged by the snubber which the snubber could not accommodate. Such transient loads are known to result from a number of different causes including reel "pick," which occurs when the film frictionally engages its reel flange momentarily because of a bent flange or a wobbling reel, and unintentional momentary stoppage or speedup of the reel because the reel has been touched by the operator or some other external object while rotating. When the projector is of the variable-rate type, such as that disclosed in U.S. Pat. No. 3,261,654, issued July 19, 1966 in the names of Faber and McClellan, entitled FILM FEEDING MECHANISM, in which the rate of projection can be shifted rapidly without stopping the film-feeding mechanism, a large and abrupt transient load may be imposed on the film which the conventional snubber cannot handle. Obviously, in motion-picture projectors of the reversible type, when the projector is quickly reversed the load on the film may be even higher.

Such transient loads, depending upon their size and direction, vary the tension in the portion of film engaged by the snubber, and thereby impose an abnormally low-frequency surge upon the normal high frequency oscillation caused by the intermittent film feeding mechanism. The result is that the snubber is momentarily overextended in its movement, and an excessive load is placed on the intermittent film feeding mechanism which prevents it from properly registering the successive frames of film at the projection aperture of the gate. In responding to these surfaces resulting from such transient overloads, the snubber tends to overreact in the opposite direction, and a hunting action occurs before the snubber is able to resume its normal frequency and amplitude of oscillation. During the interval in which the snubber is hunting, the projected image is moving up and down on the screen, very possibly for a number of successive frames of film. Should such transient overloads occur with sufficient frequency, the unsteadiness in film projection could prevail throughout a major portion of the film presentation.

Past attempts to solve this problem have generally resulted in snubbing devices and associated means for absorbing transient overloads that have been relatively complex in design and expensive to manufacture. Examples of such devices may be found in U.S. Pat. No. 3,331,541, issued July 18, 1967 in the names of Cherniavskyj et. al., entitled SPROCKETLESS PROJECTOR, and in U.S. Pat. No. 3,350,023, issued Oct. 31, 1967 in the name of Bundschuh, entitled SPROCKETLESS MOTION PICTURE PROJECTOR. While such devices have served their intended purpose, the complexity and cost of such devices somewhat limits their use in motion-picture projectors.

SUMMARY OF THE INVENTION

Accordingly, an object of the present invention is to provide, for use in sprocketless motion-picture projectors, a simplified film snubber which will enable the projector to operate effectively without undesirable unsteadiness of the projected image resulting from transient overloads that may be imposed on the film during projection.

Another object of the invention is to provide such a film snubber between the delivery reel and the film gate which will enable the projector to operate effectively particularly with reels of the larger known sizes without being subject to such undesirable unsteadiness of the projected image.

A further object of the invention is to provide such a film snubber for use with large reels in a motion-picture projector so the reversible type, particularly a projector of the variable-speed, reversible type.

Still another object of the present invention is to provide such a film snubber for use in a sprocketless motion-picture projector having a so-called tendency drive mechanism whereby the reel from which film is being delivered is adapted to normally resist film delivery, the film snubber serving to form the equivalent of a free loop of film ahead of the projection gate and to respond resiliently to, and thereby absorb, variations in film tension resulting from operation of the intermittent film feeding mechanism and from the inertia of the reel.

A still further object of the invention is to provide such a film snubber that is capable of a plurality of different modes of response to variations in tension of the film engaged by the snubber, whereby the snubber would be especially suitable for minimizing the adverse effects upon film projection resulting from film tension variations covering a wide range of frequencies.

Still another object of the present invention is to provide such a film snubber that is significantly simpler in design and operation, less expensive to manufacture and install in the projector, and more likely to provide reliable film-snubbing action throughout the effective life of the projector, than are snubbers known heretofore.

To meet these and other objects, the present invention provides an improved film snubber for use in a sprocketless motion-picture projector having means for rotatably supporting a film reel, a film projection gate adapted to receive film from the reel, and film-advancing means associated with the gate for intermittently advancing film relative to the gate and for concomitantly establishing a tensional force on the film to pull film from the reel. In general, the film snubber is positioned between the reel and the gate and is operative to resiliently engage film between the reel and the gate, the snubber being resiliently responsive to variations in film tension resulting from intermittent advancement of film relative to the gate and from the inertia of the reel so as to resiliently oppose displacement of the film and thereby compensate for the variations in film tension. In the preferred embodiment, a biasing means urges the snubber into engagement with the film, to establish a first mode of resilient response of the snubber in response to variations in film tension. Also in the preferred embodiment, the snubber is provided with a resilient portion that is engageable with the film to establish a second mode of resilient response of the snubber in response to variations in film tension.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of photographic and related apparatus are well known, the following description is directed in particular to those elements forming, or cooperating directly with, the present invention, elements that are not specifically shown or described herein being understood to be selectable from those known in the art.

Figure 1:
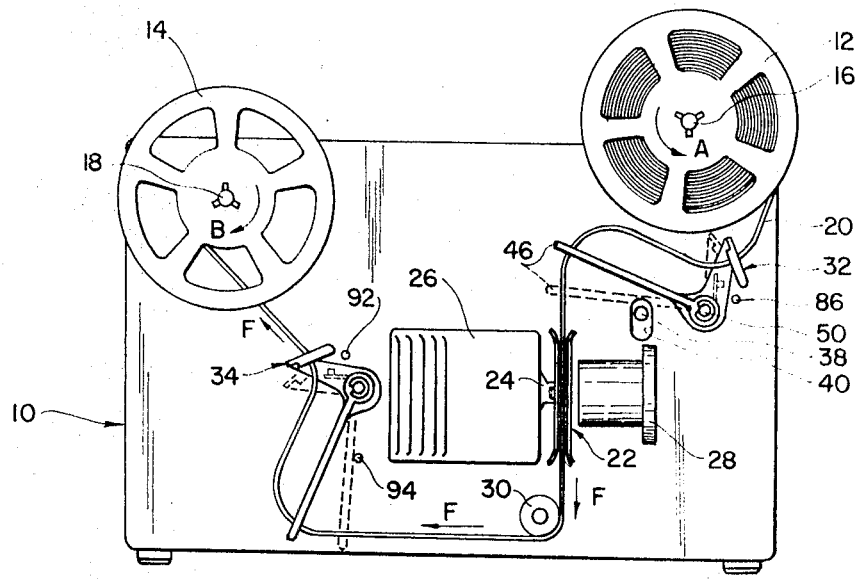
FIG. 1 is a schematic, elevational view of a reversible, sprocketless, motion-picture projector having a pair of film snubbers constructed in accordance with the present invention.

Generally speaking, the preferred embodiment of the present invention, as illustrated in FIG. 1 of the drawings, is incorporated in a sprocketless motion-picture projector which is reversible without stopping its prime mover and in which the rate of projection can be rapidly changed while the projector is operating in either direction. The projector is also capable of handling film reels of up to 400-foot capacity without showing, because of the snubbers used therein, any significant undesirable unsteadiness in the projected picture. The support spindles for the film supply and film takeup reels are adapted to resist delivery of film from reels mounted thereon by the operation of a reversible intermittent film feed means arranged adjacent to the film projection gate for the purpose of intermittently advancing film therethrough. A film snubber in accordance with the present invention is located between each reel spindle and the gate, and is biased into engagement with the adjacent portion of film to provide the equivalent of a free loop at each end of the gate to isolate the gate and the intermittent film feed means adjacent thereto from any direct pull on the film induced by the inertia and/or any erratic rotation of the associated reel. Each of the snubbers is so designed and arranged as to oscillate freely in response to variations in tension of the engaged film resulting from operation of the intermittent film feeding mechanism and from the inertia and/or any erratic rotation of the associated reel. With each film snubber biased into engagement with the adjacent portion of film, the snubber remains in engagement with the film even during negative surges that might cause an excess of film to be fed from the associated reel into the portion of film so engaged. This is highly advantageous, for when film disengages the snubber for any reason, the system is powerless to absorb forces applied during that portion of the cycle. Such constant engagement tends to minimize the effects of large negative transients which might be encountered at the time the projector is reversed because of possible time lags in the clutch mechanisms acting on the reel spindles to resist delivery of film from the reels.

Oscillation of the snubber under the combined influences of, on the one hand, the film-feeding mechanism and the inertia and possibly erratic rotation of the film reel and, on the other hand, the means biasing the snubber into engagement with the film thus provide a first mode of resilient response to variations in film tension.

A second mode of resilient response to variations in film tension, particularly high-frequency variations caused by operation of the film-feeding mechanism, may be provided by the resilient nature of one of the film-engaging portions of the snubber, the resilient portion taking the form, in the preferred embodiment, of a resilient spring arm capable of flexing in response to variations in tension of the film engaged thereby.

A third mode of response to film tension variations may also be provided in the form of a damping fluid acting upon the snubber for the purpose of damping the fluctuations of the snubber resulting from the aforementioned variations in film tension.

Means are also provided by which further movement of the snubber at the end of the film projection mode of projector operation initiates a change from the film projection mode to the film rewind mode of projector operation for the purpose of effecting automatically the rewinding of the film just projected.

Referring now to the drawings, FIG. 1 illustrates a reversible, sprocketless, motion-picture projector 10 supporting a supply reel 12 and a takeup reel 14, reels 12 and 14 being mounted on spindles 16 and 18, respectively. Shown between reels 12 and 14 is a strip of film 20 as it is drawn from reel 12, by a film pulldown mechanism 24, through a film projection gate 22 and onto reel 14 during projector operation in the forward direction, designated by the arrows F. Projector 10 includes a lamp housing 26 and a lens system 28 for projecting an image of the film in gate 22 onto a viewing surface. Also provided, but not shown, is a shutter mechanism enabling film 20 to be viewed only during moments when it is held in gate 22. Assisting the movement of film 20 from gate 22 to reel 14 is a roller 30. Arranged in the film path between reel 12 and gate 22 is a snubber 32 for providing the equivalent of a free loop of film between reel 12 and gate 22 during film projection operation of the projector in the forward direction. Similarly placed between reel 14 and roller 30 is a second snubber 34 for providing the equivalent of a free loop of film between reel 14 and gate 22 during film projection operation of the projector in the reverse direction. Since the construction and operation of snubber 34 are virtually identical to the construction and operation of snubber 32, the details of snubber 32 only will be described hereinafter.

As shown by the arrows A and B on reels 12 and 14, respectively, the spindles 16 and 18 are rotatively driven in opposite directions by what is known in the art as a tendency type of drive, described more fully, for example, in U.S. Pat. No. 3,310,251, issued Mar. 21, 1967 in the name of Robert B. Johnson, entitled REEL DRIVE MECHANISM. The tendency drive serves to place film 20 in constant tension as it moves from reel 12 through gate 22 and onto reel 14. As is well known in the motion-picture projector art, continued operation of the projector in its projection mode in the forward direction results in the unwinding of film 20 from reel 12 and the winding of film 20 onto reel 14 until nearly all of the film has been so transferred, by which time the projection mode of operation has been completed. In this case, it is assumed that the final end portion of film 20 is secured to the core of reel 12 so that, at the completion of the film projection mode of operation in the forward direction, the film pulldown mechanism 24 tends to pull the portion of film between reel 12 and gate 22 to a taut state. As will be described more fully hereinafter, this causes snubber 32 to be rotated counterclockwise from its mean operating position shown in solid lines to its position shown in broken lines, wherein the leftward-extending arm is brought into engagement with a pin 38 to move pin 38 downward in slot 40 and thereby change the operation of the projector from its film projection mode to its film rewind mode. In the film rewind mode, the projector's prime mover (not shown) is coupled to spindle 16 in order to drive reel 12 in the direction of arrow A and thereby effect rewinding of film 20 from reel 14, back through gate 22, and onto reel 12.

Snubber 32 will now be described in detail with particular reference to FIGS. 2, 3, and 4. As is most readily apparent in FIG. 2, snubber 32 comprises a hub portion 42 and a pair of angularly spaced arms 44 and 46 extending radially outwardly from hub 42. Hub 42 has a cylindrical bore 48 for receiving a stud or other journal member 50 which is secured to a wall member 52 of the projector as at opening 54. A shoulder 56 is provided at the right-hand end of stud 50 to retain hub 42 against rightward movement thereon. A torsion spring 58 is adapted to be mounted on stud 50 between shoulder 56 and hub 42 in order to engage at its hooked end 60 a hole 62 in wall 52 and at its straight end 64 the leftward-facing surface 66 of a lug 68 extending from snubber 32 as shown, thereby biasing snubber 32 in the clockwise direction. Arms 44 and 46 have, at their radially outer portions, a film-engaging surfaces 70 and 72, respectively, for engaging the portion of film 20 extending between reel 12 and gate 22. Models of snubber 32 having an angle of approximately 110° between planes passing through the rotational axis of hub 42 and film-engaging surfaces 70 and 72 have proven successful in tests conducted thereon, although other angles between said planes, depending upon the location of the snubber relative to the reel gate, could be used without deviating from the concept of this invention. Also provided on arm 44 is a downwardly extending projection 74 and a wall surface 76 for guiding film 20 as it passes under film-engaging surface 70. Similarly, on arm 46 radially outwardly extending projections 78 and 80 are provided for guiding film 20 as it passes over film-engaging surface 72. To retain snubber 32 against leftward movement on stud 50, an annular groove 82 is provided at the free end portion of stud 50 for receiving a retaining ring 84 over the left end of hub 42. Arm 44 is made sufficiently rigid to effectively resist being deflected by film 20, while arm 46 is made sufficiently resilient so that it will be deflected by film 20 during projection operation. So mounted on stud 50 and under the combined influences of spring 58 and film 20, tested models of snubber 32 have been found to normally oscillate angularly over a range of approximately 45° during film projection operation of the projector in its forward direction, as will now be described with particular reference to FIG. 3.

Figure 2:
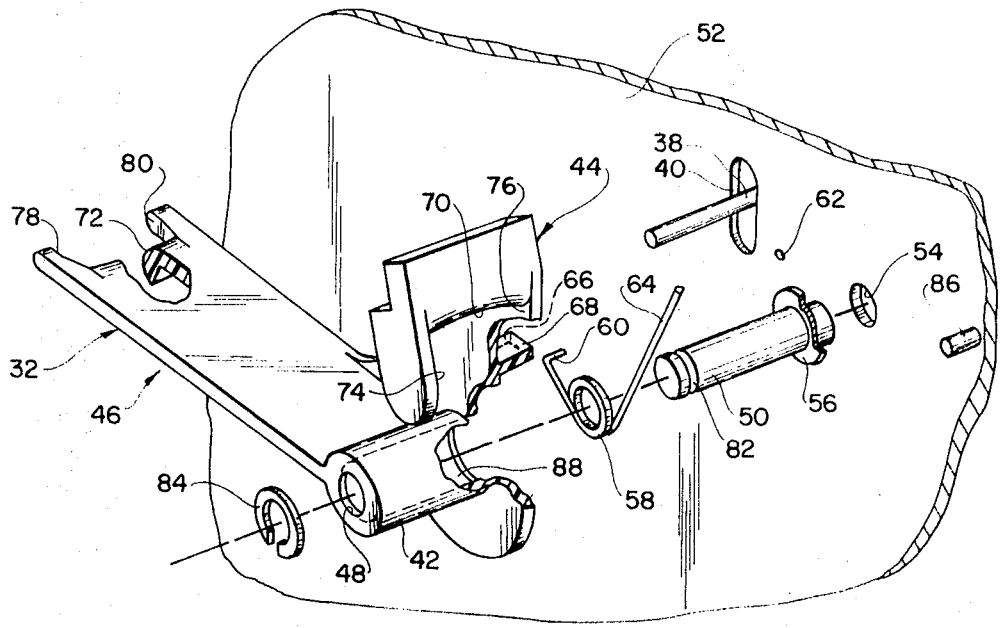
FIG. 2 is an exploded view, in perspective, of a snubber according to the present invention with portions thereof shown broken away for clarity of illustration.
Figure 3:
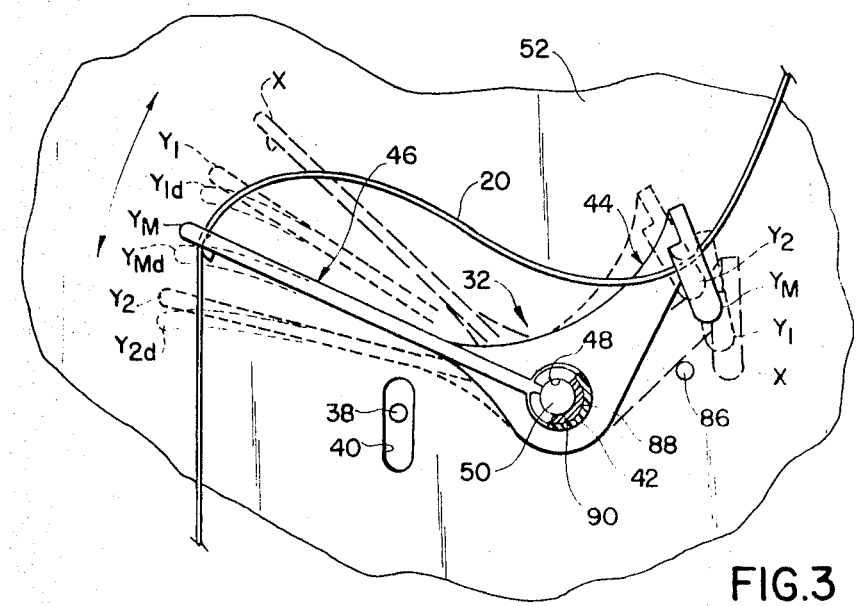
FIG. 3 is an elevational view of the snubber illustrated in FIG. 2, showing different positions to which the snubber is moved during film projection operation.
Figure 4:
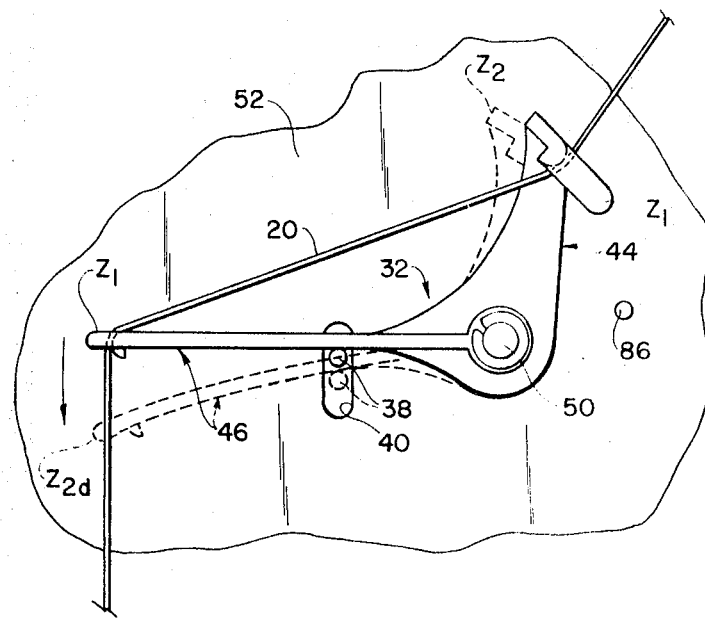
FIG. 4 is an elevational view of the snubber illustrated in FIG. 2, similar to FIG. 3 but showing the snubber moved to still different positions to actuate the film rewind cycle of projection operation.

FIG. 3 illustrates, by means of solid lines and different types of broken lines, the principal positions which snubber 32 occupies when it is in a state of rest and when it is in forward film projection operation. As described previously with reference to FIG. 2, spring 58, now shown in FIG. 3, biases snubber 32 in the clockwise direction. Accordingly, when snubber 32 is not engaged by film 20, snubber 32 is moved by spring 58 to the position designated in FIG. 3 as position X. In this position, arm 44 abuts a stop pin 86 secured to projector wall 52. When snubber 32 is engaged by film 20, the tension imposed upon film 20 by the tendency drive of spindles 16 and 18 is sufficient to cause snubber 32 to be rotated counterclockwise, against the influence of spring 58, to the position designated as $Y_1$. When snubber 32 is in position $Y_1$, the film pulldown mechanism has not yet commenced its advancement of film 20 through gate 22. Advancement of film 20 by one frame length in gate 22 causes enough added tension in film 20 to effect further rotation of snubber 32 to its position designated in FIG. 3 as $Y_2$. During the portion of the intermittent film feeding cycle when the film-feeding mechanism is not advancing film 20, film 20 is held in gate 22 by conventional pressure plate means and snubber 32 is urged by spring 58 back to its position designated as $Y_1$. Thus the combined influences of spring 58 and variations in film tension resulting from operation of film pulldown mechanism 24 and reel inertia cause snubber 32 to oscillate between positions $Y_1$ and $Y_2$, spring 58 thereby providing a first mode of resilient response to the variations in film tension.

As has already been noted, resilient arm 46 of snubber 32 is deflected in response to film tension variations, the deflected positions of arm 46 being shown, for positions $Y_1$ and $Y_2$ of snubber 32, as positions $Y_{1d}$ and $Y_{2d}$, respectively. The deflection of resilient arm 46 therefore provides a second mode of resilient response to variations in film tension. The combined influences of such first and second modes of resilient response serve to minimize the effects of film tension variations over a wide range of frequencies. As will be appreciated by those skilled in the mechanical arts, the spring rates of spring 58 and arm 46 can be established by design to provide an optimum combination of different frequency responses. In the preferred embodiment, it is contemplated that arm 46 would normally be deflected at a relatively high frequency corresponding to the operating frequency of the film pulldown mechanism, while spring 58 would normally be responsive to film tension variations occurring at lower frequencies, such as those resulting from the inertia and possible erratic rotation of reel 12. Since the inertia of reel 12 is constantly changing as more and more of film 20 is unwound therefrom during film projection in the forward direction, the broad range of frequency responses herein provided is particularly conducive to film projection that is free of the aforementioned undesirable unsteadiness of the viewed picture. Thus it can be seen that, during normal projection operation, arm 46 of snubber 32 oscillates and deflects between position $Y_1$ and $Y_{2d}$. In FIG. 3, a position designated as $Y_M$ is shown to indicate the mean position occupied by snubber 32 between positions $Y_1$ and $Y_2$; and a deflected position of arm 46, corresponding to the mean position $Y_m$, is shown designated as $Y_{md}$.

If the trailing end portion of film 20 is secured to reel 12, then as film projection is completed the portion of film 20 between reel 12 and gate 22 will be pulled tight by film-feeding mechanism 24, resulting in a film tension that exceeds the tension during film projection which effected snubber movement to position $Y_2$. Such increased tension causes snubber 32 to be rotated counterclockwise beyond the position $Y_2$ to a position designated in FIG. 4 as $Z_1$, at which position the lower surface of arm 46 abuts pin 38. Continued downward pull on film 20 by film-feeding mechanism 24 results in a further increase in film tension, thereby forcing snubber 32 to be rotated counterclockwise further to the position designated in FIG. 4 as $Z_2$. During the latter movement of snubber 32 from position $Z_1$ to position $Z_2$, arm 46 is deflected by film 20 to its position shown in FIG. 4 as $Z_{2d}$. Such downward movement of arm 46 from position $Z_1$ to position $Z_{2d}$ forces pin 38 in the downward direction in slot 40 and, in so doing, causes pin 38 to actuate the film rewind cycle of projector operation. Thus the projector mechanism is automatically shifted from its film projection mode of operation to its film rewind mode. While pin 38 in this manner serves as a trigger for actuating the film rewind cycle of projector operation, it also serves as a stop pin for limiting the counterclockwise rotation of snubber 32.

As may be seen most readily in FIGS. 2 and 3, the bore 48 of hub 42 may be enlarged as at 88 to receive a damping fluid 90 between hub 42 and stud 50. A damping fluid of suitable viscosity operably received in hub 42 would damp the fluctuations of snubber 32 as it responds to variations in film tension. Such damping action would be effective in both the clockwise and counterclockwise directions of snubber rotation, thereby providing a third mode of response to the variations in film tension encountered by snubber 32.

The aforementioned tested models of snubber 32 have been made of one-piece molded plastic, hub 42 and arms 44 and 46 being integral portions thereof, to provide the snubber of the present invention at a very low manufacturing cost.

With reference to FIG. 1, a second snubber 34 is provided between film takeup reel 14 and roller 30 to serve the same function during film projection in the reverse direction of film movement as does snubber 32 during film projection in the forward direction of film movement, the principal difference being the absence of a rewind-actuating pin such as pin 38 in association with snubber 34. As will be seen, the rotational movement of snubber 34 is limited in the clockwise direction by a fixed pin 92 and in the counterclockwise direction by a fixed pin 94. Because the design, construction, and operation of snubber 34 are virtually identical to those of snubber 32, further description of snubber 34 is considered to be unnecessary to an understanding of the present invention.

It will thus be seen that the snubber of the present invention provides an effective means of responding to variations in tension in the portion of film between the reel from which the film is being drawn and the film-feeding mechanism so that the equivalent of a free loop of film is made available to the film-feeding mechanism in a manner that avoids the unsteadiness of the projected image that has been troublesome in sprocketless motion-picture projectors heretofore. This has been achieved in the present invention by a novel combination of at least two different modes of response to film tension variations that are capable of covering a wide range of frequencies. In this manner, the major causes of film tension variations are sufficiently compensated for to enable the maintenance of a steady frame of film in the projection gate when the film-feeding mechanism is not advancing film. The addition of a third mode of response to film tension variations by means of a damping fluid in the snubber hub serves to make the snubber of this invention even more effective in attaining its desired objectives. While FIG. 1 of the drawings illustrates a reversible type of projector utilizing a pair of snubbers constructed in accordance with the present invention, it will be obvious to those skilled in the art that a unidirectionally operatable projector may have but one snubber located between the film supply reel and the projection gate. Also, while the preferred embodiment of this invention is advantageously made of one-piece molded plastic, the hub and two arms being integral portions thereof, so as to provide the snubber of the present invention at a very low cost of manufacture, it will be appreciated by those skilled in the art that a snubber according to the invention could as well comprise an assembly of two or more parts made of plastic or some other suitable material.

The invention has been described in detail with particular reference to the preferred embodiment thereof, but it will be understood that variations and modifications can be effected within the spirit and scope of the invention.

We claim:

1. In a sprocketless motion-picture projector including means for rotatably supporting a film reel having inertia, a film-projection gate adapted to receive film from the reel, and film-advancing means associated with the gate for intermittently advancing film relative to the gate and for concomitantly establishing a tensional force on the film to pull film from the reel, the improvement comprising:
   a. a film-snubbing member positioned between the reel and the gate and operative to resiliently engage film between the reel and the gate, said film-snubbing member including a resilient portion engageable with the film for establishing a first mode of resilient response of said snubbing member to variations in film tension resulting from intermittent advancement of film relative to the gate and from the inertia of the reel to resiliently oppose displacement of the film and thereby compensate for said variations in film tension; and spring means for urging said snubbing member into engagement with the film for establishing a second mode of resilient response of said snubbing member to said variations in film tension.

2. The improvement claimed in claim 1 wherein said resilient portion comprises an elongate resilient arm, said arm having a free end portion engageable with the film for movement thereby in response to said variations in film tension.

3. In a sprocketless motion-picture projector including means for rotatably supporting a film reel, a film-projection gate adapted to receive film from the reel, and film-advancing means associated with the gate for intermittently advancing film relative to the gate and for concomitantly establishing a tensional force on the film to pull film from the reel, the improvement comprising:
   a. a movably mounted film snubbing member positioned between the reel and the gate for engagement with film between the reel and the gate, said film-snubbing member including a resilient integral portion engageable with the film for effecting a first mode of displacement of said film-snubbing member in response to variations in film tension during movement of the film between the reel and the gate;
   b. means including a spring urging said snubbing member into engagement with the film for effecting a second mode of displacement of said film-snubbing member in response to said variations in film tension; and
   c. means including a damping fluid operatively associated with said film-snubbing member for effecting a third mode of displacement of said film-snubbing member in response to said variations in film tension.

4. In a sprocketless motion-picture projector including:
   a. a spindle on which a reel of film is adapted to be mounted;
   b. means acting on the spindle during operation of the projector for resisting delivery of film from a reel mounted on the spindle;
   c. a projection gate spaced from the spindle; and
   d. a film-feeding member adjacent to the gate and cyclically operatable for drawing film from a reel mounted on the spindle and intermittently advancing the film through the gate at a predetermined frequency, the film having first and second surfaces; the combination comprising:
   e. a movable snubber member having
      1. a first portion adapted to engage the first surface of the portion of film extending between the reel and the film-feeding member and
      a second portion adapted to engage the second surface of the portion of film extending between said first portion and the film-feeding member, said second portion being resiliently movable relative to said first portion from an undeflected position to a deflected position;
   f. means for mounting said snubber member for movement transversely of the portion of film said snubber member engages from
      1. a first position, wherein said snubber member forms a loop of film between the reel and the film-feeding member equal in length to at least one frame-length of film when the film-feeding member is not advancing film to
      2. a second position, to which said snubber member is moved by the portion of film said snubber member engages in response to operation of the film-feeding member to advance film through the gate by one frame-length and to correspondingly foreshorten the film loop; and
   g. means for biasing said snubber member toward said first position and into engagement with the film, said biasing means providing a predetermined biasing force enabling said snubber member to oscillate between said first and second positions in response to cyclic operation of the film feeding member; and
   h. said resiliently movable second portion of said snubber member being movable by the portion of film said second portion engages toward its deflected position in response to advancement of the film through the gate.

5. The combination claimed in claim 4 further comprising means operatively associated with said snubber member and said mounting means for damping the oscillations of said snubber member.

6. The combination claimed in claim 4 wherein the projector is operable in a film-projection mode of operation, in which film is drawn from the reel and intermittently advanced through the gate by the film feeding member, and in a film-rewind mode of operation, in which film is returned to the reel; wherein the film has a trailing end portion secured to the reel; wherein said snubber member is movable from said second position to a third position by the portion of film said snubber member engages, during projector operation in the film-projection mode, in response to an increase in film tension occuring when all of the film but the secured trailing end portion has been drawn from the reel; and wherein the combination further comprises means actuatable by said snubber member in response to movement of said snubber member to said third position for effecting a change from the film-projection mode to the film-rewind mode.

7. The combination claimed in claim 6 wherein said mode change effecting means is engageable for actuation by said resiliently movable second portion of said snubber member.

8. The combination claimed in claim 4 wherein said snubber member includes a hub portion defining an axis about which said snubber member is movable rotationally; wherein said first and second portions of said snubber member comprise first and second arms, respectively, extending radially outwardly from said hub portion, each arm terminating in a free end portion having a film-engaging surface, said first arm being sufficiently rigid to effectively resist being deflected by the portion of film said first arm engages, said second arm being sufficiently resilient to be deflected by the portion of film said second arm engages.

9. The combination claimed in claim 8 wherein said snubber member is a unitary member of molded plastic, said first and second arms being integral portions thereof.

10. The combination claimed in claim 9 wherein the film-engaging surfaces of said first and second arms are angularly spaced from each other by approximately 110°.

11. The combination claimed in claim 8 wherein said hub portion includes means defining a bearing surface concentric with said hub axis; wherein said mounting means includes a journal member fixed to the projector and mateable with said bearing surface to enable said snubber member to rotate on said journal member between said first and second positions; and wherein said biasing means includes a spring in engagement with said snubber member tending to move said snubber member rotationally toward said first position.

12. The combination claimed in claim 11 wherein said hub portion further includes means for receiving a damping fluid between said hub portion and said journal member to enable damping of the oscillations of said snubber member during operation of the projector.

13. In a reversible sprocketless motion-picture projector including:
a. a supply spindle on which a supply reel of film is adapted to be mounted;
b. a takeup spindle on which a takeup reel is adapted to be mounted;
c. means acting on each of the spindles during operation of the projector for resisting delivery of film from a reel mounted thereon;
d. a projection gate located between said supply and takeup spindles in spaced relationship therewith; and
e. a reversible film-feeding member adjacent to the gate and cyclically operatable for drawing film from one of the reels and intermittently advancing the film through the gate in a direction depending upon the direction of operation thereof, the film having first and second surfaces; the combination comprising:
f. a first movable snubber having
  1. a first portion adapted to engage the first surface of the portion of film extending between the supply reel and the film-feeding member and
  2. a second portion adapted to engage the second surface of the portion of film extending between said first portion and the film-feeding member, said second portion being resiliently movable relative to said first portion from an undeflected position to a deflected position;
g. a second movable snubber having
  1. a first portion adapted to engage the first surface of the portion of film extending between the takeup reel and the film-feeding member and
  2. a second portion adapted to engage the second surface of the portion of film extending between said first portion of said second snubber and the film-feeding member, said second portion of said second snubber being resiliently movable relative to said first portion of said second snubber from an undeflected position to a deflected position;
h. means for mounting each of said snubbers for movement transversely of the portion of film engaged thereby when film is being drawn from its associated reel from
  1. a first position, wherein the snubber forms a loop of film between the reel with which it is associated and the film-feeding member equal in length to at least one frame-length of film when the film-feeding member is not advancing film to
  2. a second position, to which the snubber is moved by the portion of film engaged thereby in response to operation of the film-feeding member to advance film through the gate by one frame-length and to correspondingly foreshorten the film loop; and
i. means for biasing each of said snubbers toward its first position and into engagement with the film, said biasing means providing a predetermined biasing force enabling the snubber to oscillate between said first and second positions in response to cyclic operation of the film feeding member;
j. said resiliently movable second portion of each of said snubbers being movable by the portion of film engaged thereby towards its deflected position in response to advancement of the film through the gate.